US010123346B1

United States Patent
Liu et al.

(10) Patent No.: US 10,123,346 B1
(45) Date of Patent: Nov. 6, 2018

(54) SYSTEMS AND METHODS FOR CONFIGURING A SCHEDULER

(71) Applicant: Sprint Spectrum LP, Overland Park, KS (US)

(72) Inventors: Chunmei Liu, Great Falls, VA (US); Hemanth Pawar, Brambleton, VA (US); Krishna Sitaram, Chantilly, VA (US); Pratik Kothari, Sterling, VA (US); Yu Zhou, Herndon, VA (US); Muhammad Ahsan Naim, Ashburn, VA (US); Luca Zappaterra, Eindhoven (NL)

(73) Assignee: Sprint Spectrum L.P., Overland Park, KS (US)

( * ) Notice: Subject to any disclaimer, the term of this patent is extended or adjusted under 35 U.S.C. 154(b) by 167 days.

(21) Appl. No.: 15/297,519

(22) Filed: Oct. 19, 2016

(51) Int. Cl.
*H04W 72/12* (2009.01)
*H04L 12/863* (2013.01)
*H04L 1/00* (2006.01)
*H04W 72/10* (2009.01)
*H04W 72/04* (2009.01)
*H04W 40/22* (2009.01)
*H04W 88/08* (2009.01)
*H04W 88/02* (2009.01)

(52) U.S. Cl.
CPC ....... *H04W 72/1226* (2013.01); *H04L 1/0018* (2013.01); *H04L 47/50* (2013.01); *H04W 40/22* (2013.01); *H04W 72/0486* (2013.01); *H04W 72/10* (2013.01); *H04W 88/02* (2013.01); *H04W 88/08* (2013.01)

(58) Field of Classification Search
CPC ......... H04W 72/1226; H04W 72/0486; H04W 72/10; H04W 40/22; H04W 88/02; H04W 88/08; H04L 1/0018; H04L 47/50
USPC ........................................................ 370/315
See application file for complete search history.

(56) References Cited

U.S. PATENT DOCUMENTS

| 8,761,077 B2 | 6/2014 | Kim et al. | |
|---|---|---|---|
| 2011/0222428 A1* | 9/2011 | Charbit | H04B 7/15557 370/252 |
| 2012/0300635 A1* | 11/2012 | Jersenius | H04L 1/1887 370/235 |
| 2013/0223258 A1* | 8/2013 | Seo | H04W 24/02 370/252 |
| 2016/0014810 A1* | 1/2016 | Tabet | H04B 7/0626 370/329 |

(Continued)

*Primary Examiner* — Peter Cheng

(57) ABSTRACT

Backhaul data may be communicated between an access node and a relay wireless device, wherein the relay wireless device serves as backhaul for a plurality of end-user wireless devices and a set of the plurality of the end-user wireless devices comprise a quality of service metric that meets a quality of service criteria. Wireless resources may be scheduled for the relay wireless device using semi-persistent scheduling such that wireless resources are pre-allocated for the relay wireless device based on a periodicity. And data may be transmitted according to the semi-persistent scheduling from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling.

12 Claims, 10 Drawing Sheets

(56) References Cited

U.S. PATENT DOCUMENTS

2017/0295567 A1* 10/2017 Chen ................ H04W 72/0406

* cited by examiner

… (1)

SYSTEMS AND METHODS FOR CONFIGURING A SCHEDULER

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay wireless device for relaying communication between a base station or access node (donor access node), and an end-user wireless device. Relay wireless devices and may be implemented at the edge of a coverage area of an access node to improve coverage and/or service, as well as in crowded areas having a high number of other wireless devices to increase the available throughput to the end-user wireless devices being relayed. However, such relays may give rise to latency issues and other delay issues due to the additional step of relaying communication from access node to end-user wireless device. A scheduler that considers service requirements, such as latency, for particular types of data with particular service requirements may enhance the service provided to the end-user of the system.

Overview

Exemplary embodiments described herein include systems, methods, and nodes for configuring a scheduler. Backhaul data may be communicated between an access node and a relay wireless device, wherein the relay wireless device serves as backhaul for a plurality of end-user wireless devices and a set of the plurality of the end-user wireless devices comprise a quality of service metric that meets a quality of service criteria. Wireless resources may be scheduled for the relay wireless device using semi-persistent scheduling such that wireless resources are pre-allocated for the relay wireless device based on a periodicity. And data may be transmitted according to the semi-persistent scheduling from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling.

DETAILED DESCRIPTION

In an embodiment, methods and system are described for configuring a scheduler. For example, a relay wireless device may connect a small cell to an access node such that the relay wireless device relays backhaul traffic to and from the access node and small cell. In such configurations, and other configurations that use a relay to connect to an access node or otherwise add an additional hop among a network path to a wireless device, certain service conditions such as latency and/or delay may be impacted. For example, data may take time to traverse the additional hop from access node to relay and then relay to end-user wireless device.

In some embodiments, the end-user wireless devices that leverage the relay may comprise quality of service metrics (i.e., application requirements) that are impacted by the latency considerations for relays. For example, voice over internet protocol (VoIP) or voice over LTE (VoLTE) services comprise latency requirements in order to achieve satisfactory service. When such end-user wireless devices are serviced by an access node (e.g., that comprises a direct backhaul without a relay) a scheduler for the access node may leverage semi-persistent scheduling to accomplish the VoIP or VoLTE services. For instance, the repeated and consistent qualities of semi-persistent scheduling may efficiently meet the latency, data rate, and other requirements for such voice services. While the additional latency considerations cause added complexity, end-user wireless devices that leverage a relay for backhaul may also benefit from these qualities of semi-persistent scheduling. Accordingly, a system that considers the latency impact and service requirements for end-user wireless devices that leverage a relay may be able to effectively and selectively utilize semi-persistent scheduling to provide enhanced services to users of the system.

Figure 1:
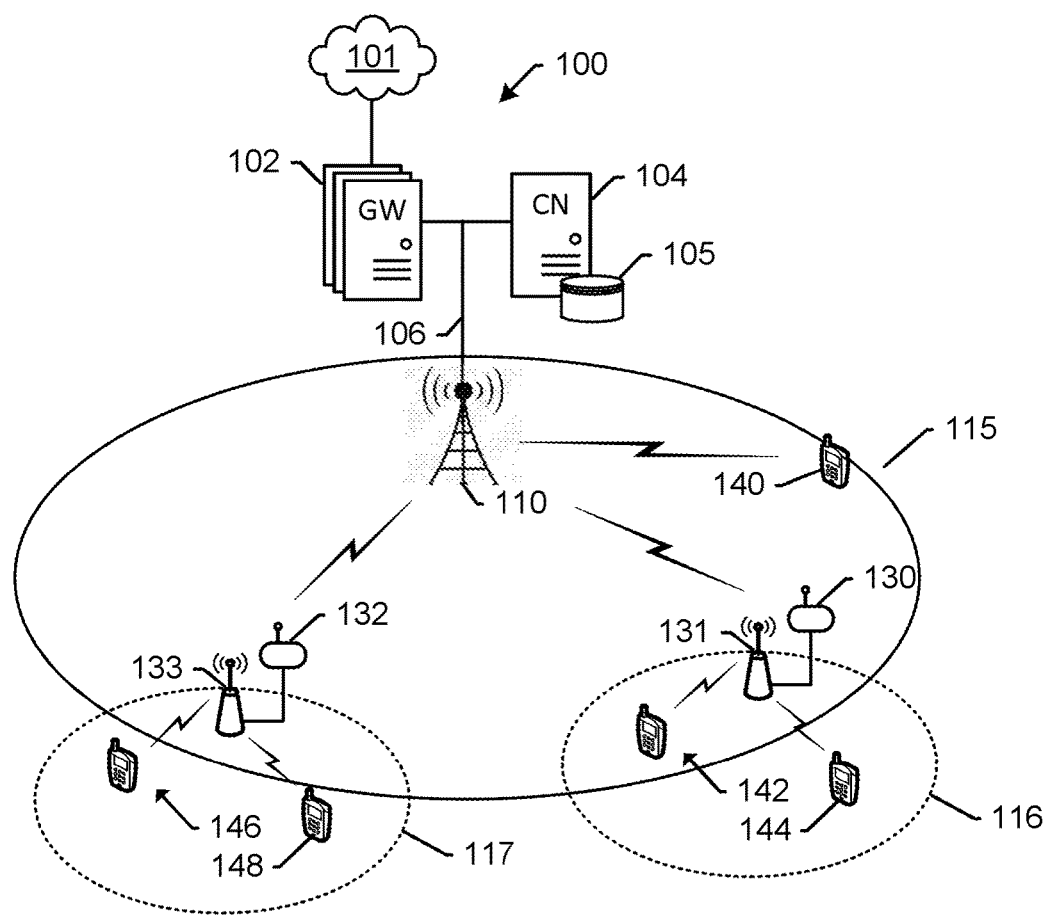
FIG. 1 depicts an exemplary system for configuring a semi-persistent scheduler according to some embodiments.

FIG. 1 depicts an exemplary system 100 configuring a semi-persistent scheduler. System 100 may comprise a communication network 101, gateway node 102, controller node 104, database 105, communication link 106, access node 110, relay wireless devices 130 and 132, wireless devices 140, 142, 144, 146, and 148, which may comprise end-user wireless devices, small cells 131 and 133, and coverage areas. In an embodiment, access node 110 provides wireless services to wireless devices 140, 142, and 144, and the illustrated relay access node that comprises a combination of relay wireless device 130 and small cell 131, which may comprise a relay access point or node. For instance, small cell 131 may provide wireless services to wireless devices 142 and 144, which may comprise end-user wireless device, and relay wireless device 130 may access communication network 101 via access node 110. Consequently, access node 110 may be referred to as a donor access node. Relay wireless device 130 is thus configured to relay services from access node 110 to wireless devices 142 and 144. Similarly, small cell 133 may provide wireless services to wireless devices 146 and 148, which may comprise end-user wireless device, and relay wireless device 132 may access communication network 101 via access node 110.

In an embodiment, to achieve this, relay wireless devices 130 and 132 may comprise a customer premise equipment (CPE), which may be any stationary LTE wireless device having a stronger computational & RF capability versus standard wireless devices, as well as a directional antenna and a dedicated power supply. Relay wireless devices 130 and 132 also may be communicatively coupled to small cells 131 and 133, respectively. Small cells 131 and 133 may include a mini-macro, picocell, femtocell, or the like that are capable of providing a wireless access point for wireless devices 142, 144, 146 and 148. Access node 110 is illustrated as having coverage area 115, small cell 131 is illustrated as having coverage area 116, and small cell 133 is illustrated as having coverage area 117. Relay wireless devices 130 and 132 are located within coverage area 115, as are wireless devices 140 and 142. Wireless device 144 is located outside of coverage area 115 but within coverage area 116 of small cell 131, and wireless devices 146 and 148 are located outside coverage area 115 but within coverage area 117 of small cell 133. In an embodiment, wireless devices 142 and 144 may access network services using the combination of relay wireless device 130 and small cell 131 and wireless devices 146 and 148 may access network services using the combination of relay wireless device 132 and small cell 133.

In an embodiment, relay wireless devices 130 and 132 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by relay wireless device 130 to one or more of wireless devices 142 and 144. Likewise, RF signals received from wireless devices 142 and 144 are amplified and transmitted by relay wireless device 130 to access node 110. Alternatively or in addition, a layer 2 relay device performs a decode and forward (DF) function. RF signals received from access node 110 are demodulated and decoded, then encoded and modulated again before being transmitted by relay wireless device 130 to one or more of wireless devices 142 and 144. Likewise, RF signals received from one or more of wireless devices 142 and 144 are demodulated and decoded, then encoded and modulated again before being transmitted by relay wireless device 130 to access node 110. Alternatively or in addition, a layer 3 relay device also performs a decode and forward function. However, a layer 3 relay device also performs additional processing (such as ciphering and/or data concatenation/segmentation/resassembly). In other words, relay wireless device 130 may perform demodulation and decoding of the received RF signals (either uplink or downlink), processing of the received data, then encode, modulate, and transmit the data to one or more of wireless devices 142 and 144. Relay wireless device 132 and wireless devices 146 and 148 may be similarly configured.

Relay wireless devices 130 and 132, and wireless devices 140, 142, 144, 146 and 148 may be any device, system, combination of devices, or other such communication platform capable of communicating wirelessly with access node 110 using one or more frequency bands deployed by access node 110. Relay wireless devices 130 and 132 and wireless devices 140, 142, 144, 146 and 148 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless devices 130 and 132 includes stronger computational & radiofrequency capabilities than an average wireless device, as well as a directional antenna, and dedicated power supply, so that they can sustain an over-the-air backhaul link for end-user wireless devices that attached to small cells.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless devices 130 and 132, and wireless devices 140, 142, 144, 146, and 148. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless devices 130 and 132, as well as a wireless device S-GW/P-DW combination for providing gateway services to one or more of wireless devices 140, 142, 144, 146, and 148. In embodiments, data packets such as voice over IP (VoIP) data packets may be routed from one or more of wireless devices 142, 144, 146, and 148 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between relay wireless devices 130 and 132 and/or wireless devices 140, 142, 144, 146, and 148, and communication network 101. Access node 110 can be a macrocell access node such as a base transceiver station, a radio base station, an eNodeB device, or an enhanced eNodeB device, or the like. In an exemplary embodiment, a macrocell access node can have a coverage area 115 in the range of approximately five kilometers to thirty five kilometers and an output power in the tens of watts.

Small cells 131 and 133 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access node 110 and small cells 131 and 133 are illustrated in FIG. 1, any number of access nodes and/or small cells can be implemented within system 100.

Access node 110 and small cells 131 and 133 can comprise a processor and associated circuitry to execute or direct the execution of computer-readable instructions to obtain information. Access node 110 and small cells 131 and 133 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and small cells 131 and 133 can receive instructions and other input at a user interface. Access node 110 communicates with gateway nodes 102 and controller node 104 via communication link 106. Operations performed by one or all of access node 110 and small cells 131 and 133 are further described herein with reference to FIGS. 4 and 6-8.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
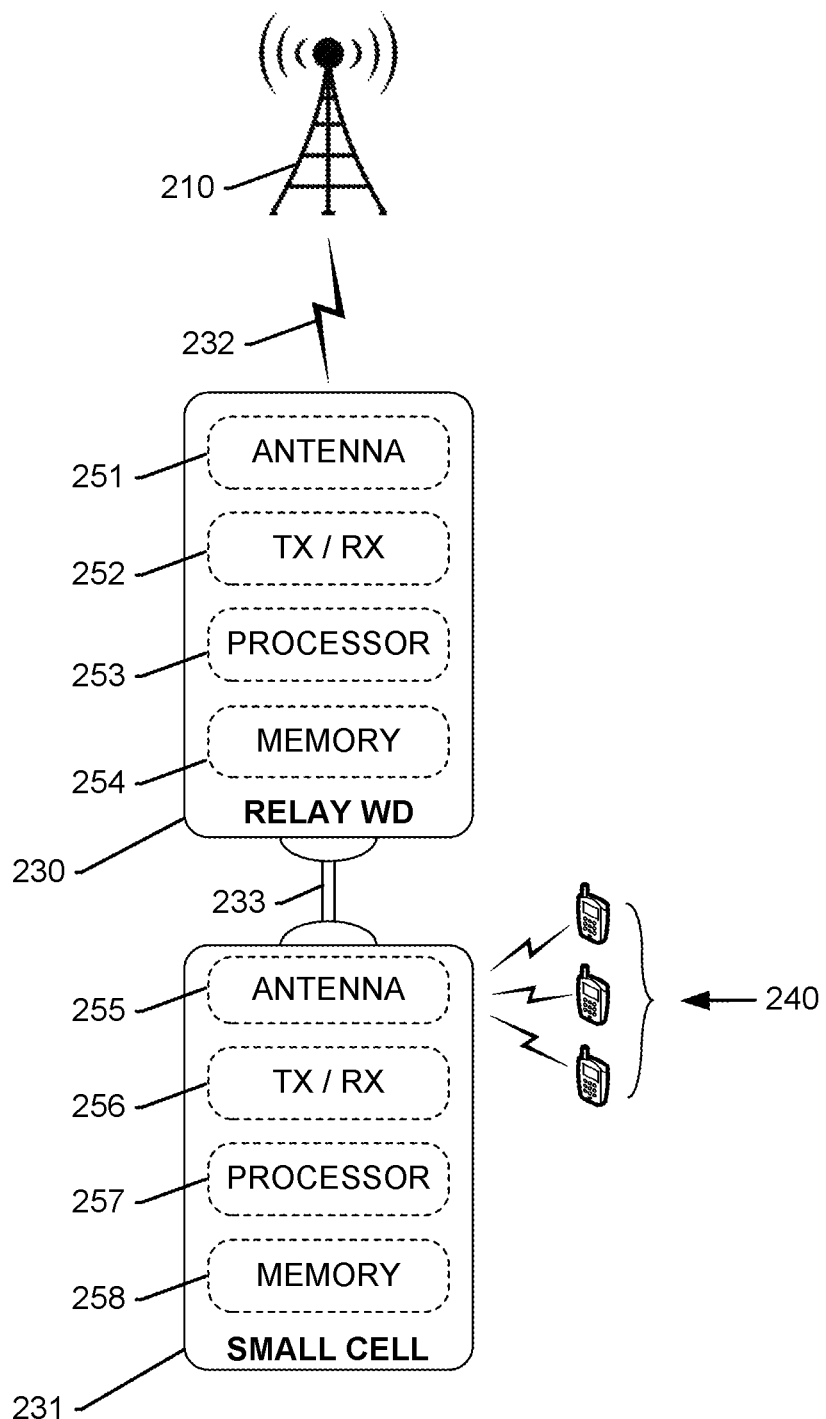
FIG. 2 depicts an exemplary relay wireless device coupled to a small cell according to some embodiments.

FIG. 2 depicts an exemplary relay wireless device 230, or relay user equipment (UE), coupled to a small cell 231, which may comprise a picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240, which may comprise end-user wireless devices, via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless devices 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 via small cell 231. Relay wireless device 230 may begin to function as a relay by sending a message to access node 210 to indicate to access node 210 that relay wireless device 230 is functioning as a relay wireless device. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
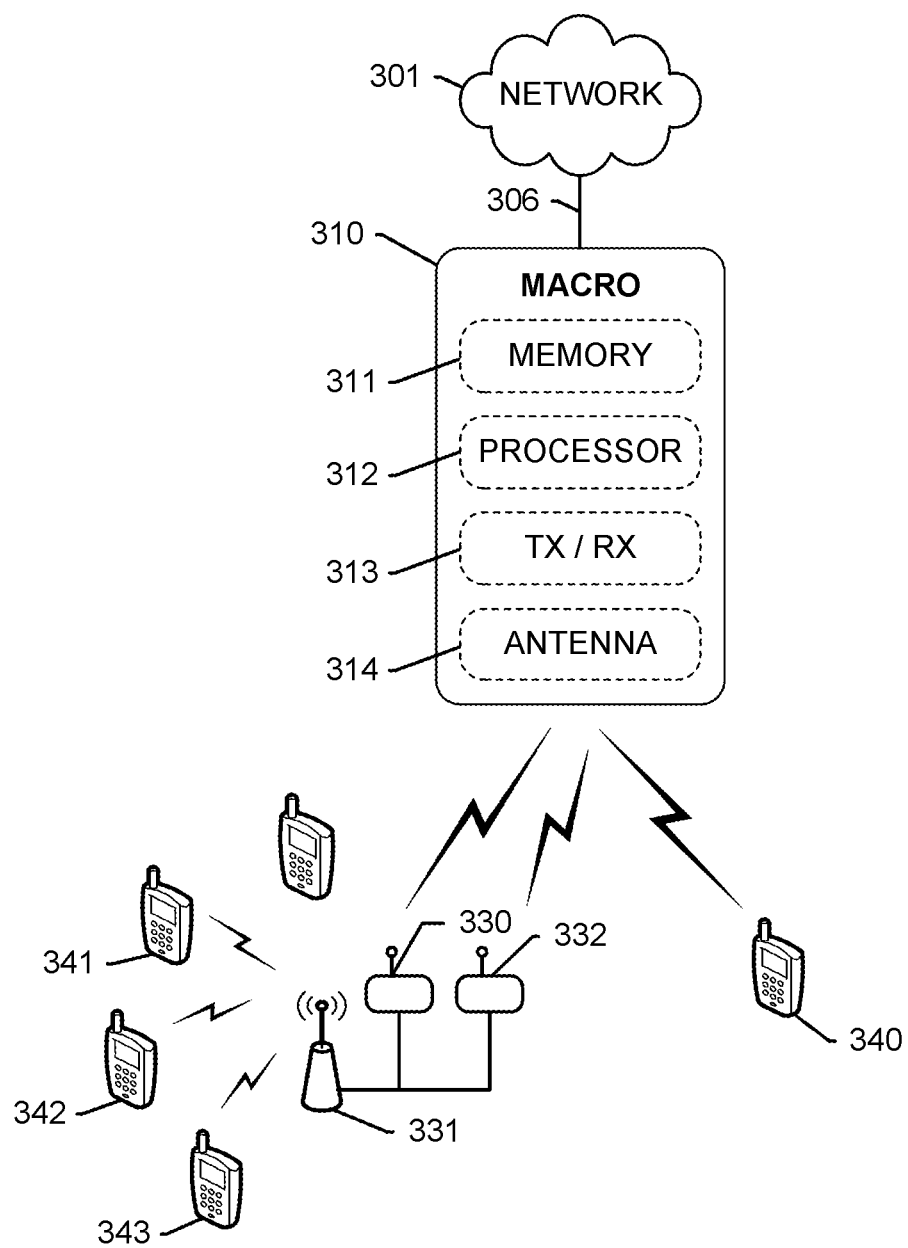
FIG. 3 depicts an exemplary access node according to some embodiments.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as end-user wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as relay wireless devices 330 and 332. Here, access node 310 provides access to network services from network 301 to end-user wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 110 may comprise a scheduler that schedules communication between wireless devices and access node 110. The scheduler may comprise hardware and associated circuitry or software implementing computer code to perform scheduling functions. The scheduler may be communicatively connected to one or more antennas of access node 110 such that the scheduler may configure the access node to transmit downlink signals and receive uplink signals according to a schedule (e.g., resource block allocations).

In an embodiment, the scheduler may schedule communication with access node 110 using semi-persistent scheduling. For example, bandwidth may be scheduled for a wireless device (e.g., based on a QCI for the wireless device) for a semi-persistent duration (e.g., over a limited period of time). Once scheduled, a physical resource block (PRB) and transmission time interval (TTI) combination may be reserved for a particular wireless device for a period of time (e.g., duration of a call). In an embodiment, the semi-persistent assigned resources for a wireless device may comprise a periodicity. For example, the assigned wireless resources (e.g., transmission of a physical resource block from access node 110 to a wireless device) may be repeated based on the periodicity for the assignment (e.g., 10 ms, 15 ms, 20 ms, and the like). In an embodiment, the semi-persistent assignment of resource to a wireless device may comprise both downlink resources (e.g., physical resource blocks on the Physical Downlink Shared Channel (PDSCH)) and uplink resources (e.g., physical resource blocks on the Physical Uplink Shared Channel (PUSCH)).

In some embodiments, as illustrated, one or more relay wireless devices may overlap with coverage area 115 of access node 110, such as relay wireless devices 130 and 132. Since the relay wireless devices serve as backhaul for one or more small cells (e.g., small cells 131 and 133), the scheduler of access node 110 may schedule communication with relay wireless devices 130 and 132.

In some embodiments, end-user wireless devices that communicate with access node 110 using a relay (e.g., wireless devices 142, 144, 146, and 148) may encounter delays and/or latency issues with data that comprises certain service requirements. For example, voice data (e.g., VoIP or VoLTE data) may comprise minimum latency requirements in order to effectively accomplish a voice call. Accordingly, it may be beneficial to configure the scheduler of access node 110 to consider the service conditions of end-user wireless devices that communicate with the access node using a relay when scheduling wireless resources for the relay wireless device.

Figure 4:
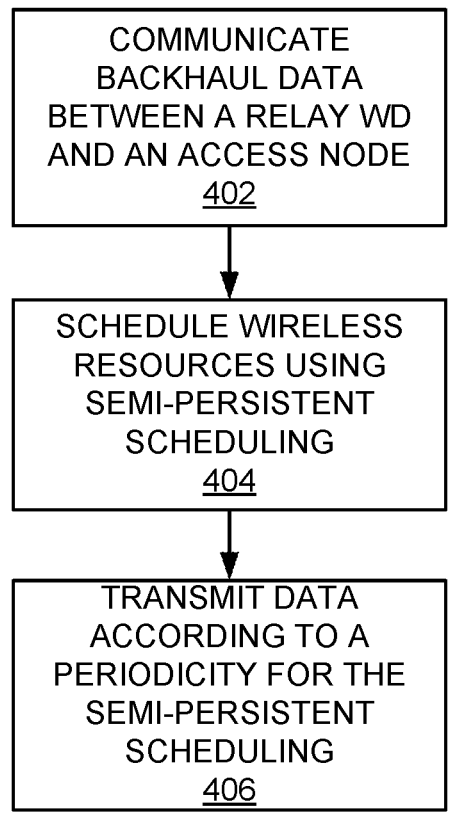
FIG. 4 depicts an exemplary method for configuring a semi-persistent scheduler according to some embodiments.

FIG. 4 illustrates an exemplary method for configuring a semi-persistent scheduler according to an embodiment. The method will be discussed with reference to the exemplary communication system 100 illustrated in FIG. 1, however, the method can be implemented with any suitable communication system.

Referring to FIG. 4, at step 402, backhaul data may be communicated between an access node and a relay wireless device, wherein the relay wireless device serves as backhaul for a plurality of end-user wireless devices and a set of the plurality of the end-user wireless devices comprise a quality of service metric that meets a quality of service criteria. For example, access node 110 may communicate with relay wireless device 130 such that backhaul data for wireless devices 142 and 144, and other wireless devices not depicted, may be communicated between the access node and relay wireless device. In this example, small cell 131 may be coupled to relay wireless device 130 such that the small cell and relay wireless device provide wireless services for end-user wireless devices, such as wireless devices 142 and 144, and other wireless devices not depicted.

In an embodiment, wireless devices 142 and 144 may comprise a quality of service metric, such as an application requirement (e.g., quality of service class identifier (QCI)) that meets a quality of service criteria. For example, the quality of service metric may be a particular QCI or a set of QCIs associated with VoIP or VoLTE services.

At step 404, wireless resources may be scheduled for the relay wireless device using semi-persistent scheduling such that wireless resources are pre-allocated for the relay wireless device based on a periodicity. For example a scheduler at access node 110 may use semi-persistent scheduling with a determined periodicity such that wireless resources are pre-allocated (reserved) for relay wireless device 130 and such pre-allocation is repeated according to the periodicity.

At step 406, data may be transmitted according to the semi-persistent scheduling from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling. In an embodiment, the semi-persistent scheduling for relay wireless device 130 may be used to carry data (e.g., to small cell 131) for the wireless devices 142 and 144, which comprise a quality of service metric (e.g., QCI) that meets the criteria. Here, data may arrive at access node 110 that is associated with one of wireless devices 142 and 144 prior to a pre-allocated scheduled transmission according to the periodicity for the semi-persistent scheduling. This data may be queued such that it is transmitted to relay wireless device 130 at the next transmission scheduled according to the semi-persistent scheduling periodicity.

Figure 5:
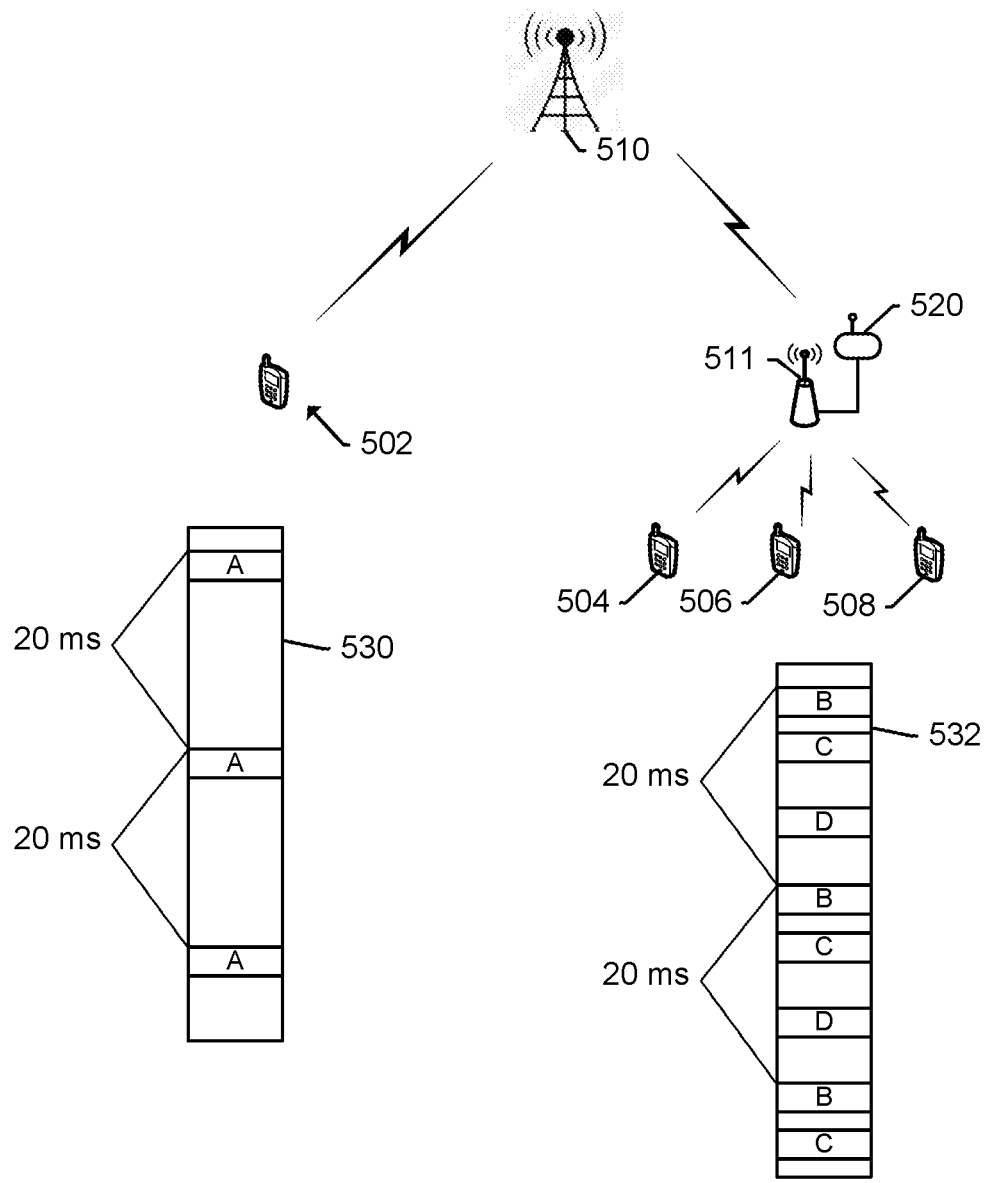
FIG. 5 depicts a semi-persistent scheduling configuration according to some embodiments.

FIG. 5 illustrates a semi-persistent scheduling configuration according to embodiments. For example, access node 510 may communicate with wireless device 502, which may comprise an end-user wireless device, and relay wireless device 520. In this example, relay wireless device 520 may couple with small cell 511 to provide wireless services to wireless devices 504, 506, and 508, which may comprise end-user wireless devices. Access node 510 and relay wireless device 520 may communicate backhaul data for small cell 511 and wireless devices 504, 506, and 508.

In an embodiment, a scheduler at access node 510 may schedule wireless resources for wireless device 502 and relay wireless device 520 using semi-persistent scheduling. For both wireless devices, the semi-persistent scheduling may comprise a periodicity of 20 ms. Here, wireless devices 502, 504, 506, and 508 may be executing a VoIP or VoLTE voice call, and the semi-persistent scheduling may be used to carry data associated with the calls. Queues 530 and 532 may comprise data queues at access node 510 for data to be transmitted to wireless device 502 and relay wireless device 520, respectively.

Queue 530 illustrates that data (e.g., a data packet) may arrive at access node 510 for wireless device 502 approximately every 20 ms, and thus the semi-persistent scheduling at a periodicity of 20 ms is well suited to carry the data. Queue 532 illustrates that data (e.g., data packets) may arrive at access node 510 for relay wireless device 520 at various times between the 20 ms periodicity for the semi-persistent scheduling. This is at least because relay wireless device 520 carries data for multiple end-user wireless devices (e.g., wireless devices 504, 506, and 508). Accordingly, the data may be queued, as illustrated by queue 532, such that it is sent in a batch manner during the next scheduled transmissions according to the periodicity for semi-persistent scheduling. Here, an approximately 20 ms latency impact may be maintained even though the data may be queued for some period of time at access node 510 due to the 20 ms periodicity for semi-persistent scheduling. Other embodiments may reduce the periodicity for the semi-persistent scheduling using to schedule resources for a relay wireless device to maintain a certain latency.

Figure 6:
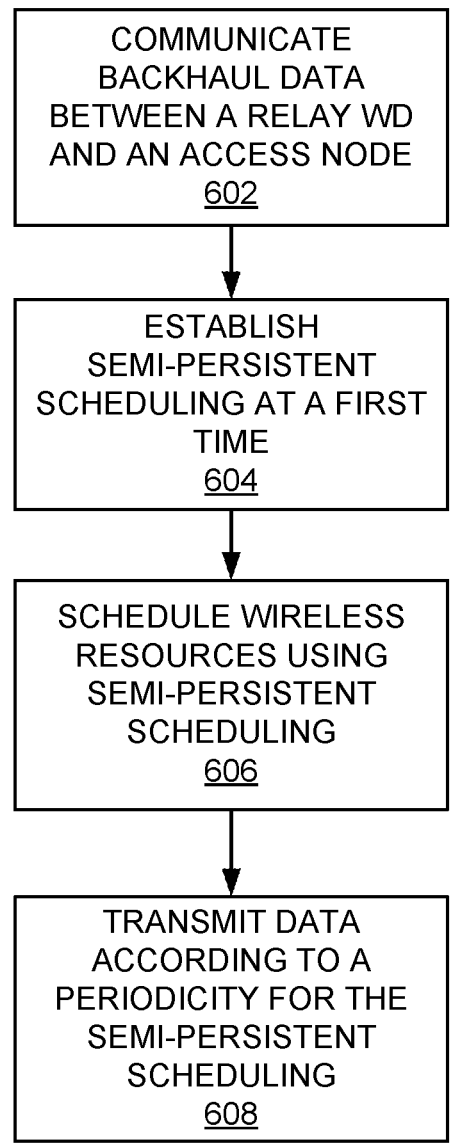
FIG. 6 depicts another exemplary method for configuring a semi-persistent scheduler according to some embodiments.

FIG. 6 illustrates an exemplary method for configuring a semi-persistent scheduler according to an embodiment. The method will be discussed with reference to the exemplary communication system 100 illustrated in FIG. 1, however, the method can be implemented with any suitable communication system.

Referring to FIG. 6, at step 602, backhaul data may be communicated between an access node and a relay wireless device, wherein the relay wireless device serves as backhaul for a plurality of end-user wireless devices and a set of the plurality of the end-user wireless devices comprise a quality of service metric that meets a quality of service criteria. For example, access node 110 may communicate with relay wireless device 130 such that backhaul data for wireless devices 142 and 144, and other wireless devices not depicted, may be communicated between the access node and relay wireless device. In this example, small cell 131 may be coupled to relay wireless device 130 such that the small cell and relay wireless device provide wireless services for end-user wireless devices, such as wireless devices 142 and 144, and other wireless devices not depicted.

In an embodiment, wireless devices 142 and 144 may comprise a quality of service metric (e.g., QCI) that meets a quality of service criteria. For example, a quality of service metric may comprise an application requirement for communication between a wireless device and an access node, such as a QCI, a minimum guaranteed bit rate (GBR), maximum bit rate (MBR), a priority, a minimum bit rate, a maximum permitted data delay, a minimum throughput, a maximum error rate, a maximum data loss rate, and any other application requirement.

In an embodiment, the quality of service criteria may be a particular QCI or a set of QCIs associated with VoIP or VoLTE services. For example, in an implementation that uses LTE, the quality of service criteria may comprise one or more of QCI 1, QCI 5, or any other QCI suitable to provide voice services. Thus, quality of service metrics for wireless devices 142 and 144 (e.g., QCIs) that meet the criteria may indicate that the wireless devices are executing or initiating a VoIP or VoLTE voice call. In other embodiments, other wireless services, quality of service criteria, and QCIs may be implemented.

At step 604, a semi-persistent scheduling may be established for the relay wireless device at a first time, wherein the pre-allocated resources associated with the semi-persistent scheduling are used to carry data for the set of wireless devices that comprise a quality of service metric that meets the quality of service criteria at the first time. For example, at a first point in time, the quality of service metrics for wireless devices 142 and 144 may be retrieved and it may be determined that these quality of service metrics meet a criteria, as described herein. Accordingly, wireless devices 142 and 144 may comprise a set of wireless devices such that the quality of service metrics for these wireless devices meet the quality of service criteria.

In an embodiment, semi-persistent scheduling may be established at access node 110 for relay wireless device 130 at the first point in time, wherein the semi-persistent scheduling is used to carry data for the set of wireless devices. For example, the configuration for the semi-persistent scheduling, such as periodicity and wireless resources to be pre-allocated (reserved), may be based on a number of wireless devices that comprise the set. In an embodiment, the periodicity may be inversely related to the number of wireless devices that comprise the set and the wireless resources (e.g., number of physical resourced blocks) may be directly related to the numbers of wireless devices that comprise the set. In other words, the periodicity may be reduced from a default value (e.g. 20 ms) as the number of wireless devices that comprise the set increases and a number of physical resource blocks pre-allocated may be increased from a default number as the number of wireless devices that comprise the set increases. In an embodiment, the configuration for the established semi-persistent scheduling me be specifically based on the set of wireless devices (e.g., number that comprise the set) at the first point in time.

In an embodiment, a traffic priority for the semi-persistent scheduling may be determined based on a default traffic priority, a number of wireless devices that comprise the set of wireless devices, and a load at the access node. For example, based on the quality of service metric for the set of wireless devices, the semi-persistent scheduling may comprise a default traffic priority. In an illustrative embodiment, for an LTE implementation, the set of wireless devices may comprise a QCI of 1 and the default traffic priority may comprise 2. Other examples with other default priorities and quality of service metrics may be similarly implemented.

In an embodiment, the determined traffic priority for the semi-persistent scheduling my comprise a dynamic traffic priority, as the priority may be adjusted based on the circumstances at the access node and/or relay wireless device. In an example, the dynamic traffic priority may be calculated using the equation: Dynamic_TP=Default_TP+P (l,n). Here, Default_TP may comprise the default traffic priority, as discussed herein. P(l,n) may represent a function "P" of the load at the access node (e.g., access node 110), "l," and a number of wireless devices that comprise the set of wireless devices, "n." P( ) may comprise a non-decreasing function of "l" and a non-decreasing function of "n" such that the value of the function is directly related to both cell load and the number of wireless devices that comprise the set. The traffic priority for the semi-persistent scheduling may raise as the value of dynamic traffic priority, as calculated in the above equation, increases.

A load metric for an access node may comprise physical resource block utilization, processor utilization, data bearer channel utilization, number of RRC connections, number of wireless devices serviced, any combination of these metrics, and the like. In an embodiment, the determined priority for the semi-persistent scheduling may be adjusted as the circumstances at access node 110 and relay wireless device 130 change.

At step 606, wireless resources may be scheduled for the relay wireless device using semi-persistent scheduling such that wireless resources are pre-allocated for the relay wireless device based on a periodicity. For example, a scheduler at access node 110 may implement the established semi-persistent scheduling with the determined periodicity such that determined wireless resources for the semi-persistent scheduling are pre-allocated (reserved) for relay wireless device 130 and such pre-allocation is repeated according to the periodicity. In an embodiment, the semi-persistent scheduling may be used to carry data from access node 100 to relay wireless device 130 that is related to voice services being performed at the set of wireless devices (e.g., wireless devices 142 and 144). For example, data associated with the set of wireless devices that comprise a predetermined quality of service metric (e.g., QCI) may be transmitted using the semi-persistent scheduling. Relay wireless device 130 may be connected to small cell 131, and once the data arrives at relay wireless device 130 it may be sent to small cell 131 for scheduling such that it may be transmitted to the individual wireless devices that comprise the set (e.g., wireless devices 142 and 144).

At step 608, data may be transmitted according to the semi-persistent scheduling from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling. In an embodiment, data may arrive at access node 110 that is associated with one of the set of wireless devices prior to a pre-allocated scheduled transmission according to the periodicity for the semi-persistent scheduling. As described with reference to FIG. 5, this data may be queued such that it is transmitted to relay wireless device 130 at the next transmission scheduled. In an embodiment, the queued data may be sent in a batch manner during the next scheduled transmissions according to the periodicity for semi-persistent scheduling. Here, an approximately 20 ms latency impact may be maintained even though the data may be queued for some period of time at access node 510 due to the 20 ms periodicity for semi-persistent scheduling. In other examples, the periodicity for the semi-persistent scheduling may be reduced in order to achieve a particular latency.

Figure 7:
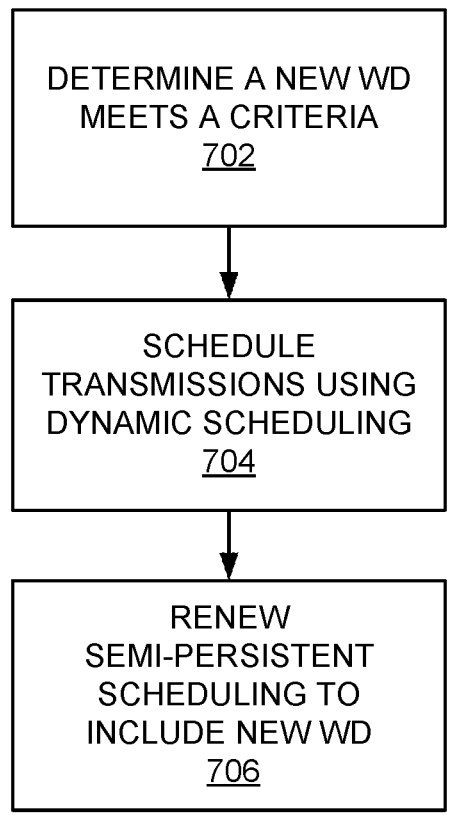
FIG. 7 depicts an exemplary method for renewing a semi-persistent scheduling according to some embodiments.

FIG. 7 illustrates an exemplary method for renewing a semi-persistent scheduling according to some embodiments according to an embodiment. The method will be discussed with reference to the exemplary communication system 100 illustrated in FIG. 1, however, the method can be implemented with any suitable communication system.

In an embodiment, the method of FIG. 7 may be performed during the method of FIG. 6. For example, a semi-persistent scheduling may be established based on the method of FIG. 6. Referring to FIG. 7, at step 702, it may be determined that a new wireless device that is not part of the set of wireless devices comprises a quality of service metric that meets the quality of service metric criteria. For example, at a second point in time, after the semi-persistent scheduling has been established based on the method steps of FIG. 6, a quality of service metric (e.g., QCI) for a new wireless device (not depicted) may be retrieved and it may be determined that the retrieved quality of service metric meets the quality of service criteria, discussed herein with reference to FIG. 6. In this example, the new wireless device is not a part of the set of wireless devices which were used to establish the semi-persistent scheduling at the first time. In an embodiment, the quality of service metric retrieved for the new wireless device may indicate that the wireless device is executing or initiating a VoIP or VoLTE voice call.

At step 704, transmissions may be scheduled for data associated with the new wireless device using dynamic scheduling. For example, transmissions from access node 110 for data associated with the new wireless device may be scheduled for transmission to relay wireless device 130 using dynamic scheduling (e.g., a default scheduling) rather than the established semi-persistent scheduling. Here, because the established semi-persistent scheduling is configured for the set of wireless devices at the first point in time, data associated with the new wireless device is not transmitted using the semi-persistent scheduling until renewal and/or adjustment of the semi-persistent scheduling. For example, the established semi-persistent scheduling may comprise a renewal timer such that the semi-persistent scheduling is renewed, adjusted, or terminated upon expiration of the renewal period.

At step 706, upon expiration of the renewal period, the semi-persistent scheduling may be renewed and/or adjusted such that pre-allocated resources associated with the renewed semi-persistent scheduling are used to carry data for the set of wireless devices that comprise a quality of service metric that meets the quality of service criteria and the new wireless device that comprises quality of service metric that meets the quality of service criteria. In an embodiment, after the renewal timer has expired, the established semi-persistent scheduling may be renewed based on both the set of wireless devices (e.g. wireless devices 142 and 144) and the new wireless device. For example, the periodicity, pre-allocated (reserved) wireless resources, priority, and any other configuration settings may be determined based on both the set of wireless devices and the new wireless device. These semi-persistent scheduling configurations may be determined in a manner similar to other embodiments discussed herein. In an embodiment, the renewed and/or adjusted semi-persistent-scheduling may be used to carry data from access node 110 to relay wireless device 130 that is associated with both the set of wireless devices and the new wireless device.

Figure 8:
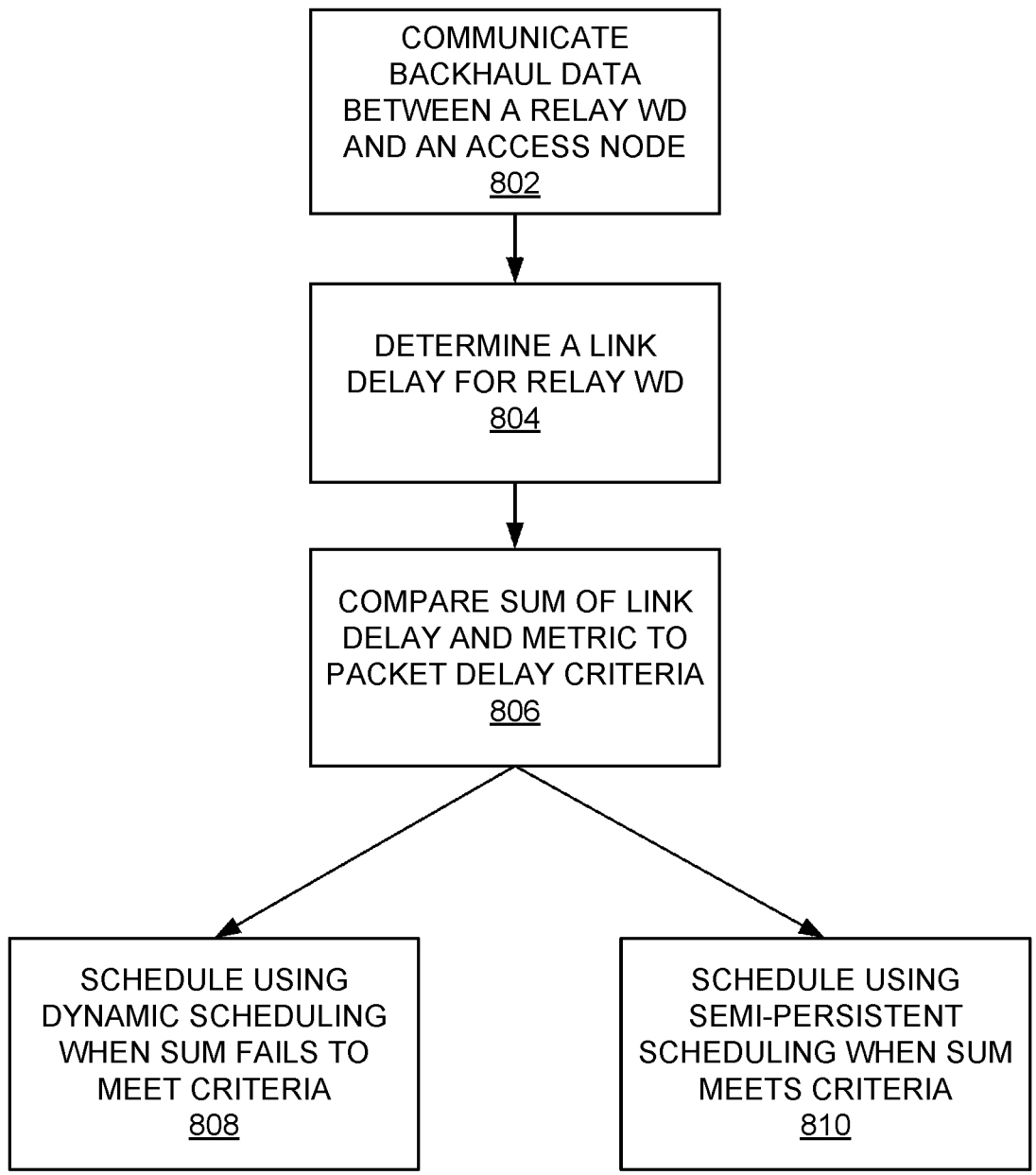
FIG. 8 depicts another exemplary method for configuring a semi-persistent scheduler according to some embodiments.

FIG. 8 illustrates an exemplary method for configuring a scheduler according to an embodiment. The method will be discussed with reference to the exemplary communication system 100 illustrated in FIG. 1, however, the method can be implemented with any suitable communication system.

Referring to FIG. 8, at step 802, backhaul data may be communicated between an access node and a relay wireless device, wherein the relay wireless device serves as backhaul for a plurality of end-user wireless devices and a set of the plurality of the end-user wireless devices comprise a quality of service metric that meets a quality of service criteria. For example, access node 110 may communicate with relay wireless device 130 such that backhaul data for wireless devices 142 and 144, and other wireless devices not depicted, may be communicated between the access node and relay wireless device. In this example, small cell 131 may be coupled to relay wireless device 130 such that the small cell and relay wireless device provide wireless services for end-user wireless devices, such as wireless devices 142 and 144, and other wireless devices not depicted.

In an embodiment, wireless devices 142 and 144 may comprise a quality of service metric (e.g., quality of service class identifier (QCI)) that meets a quality of service criteria. For example, a quality of service metric may comprise an application requirement for communication between a wireless device and an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement.

In an embodiment, the quality of service metric may be a particular QCI or a set of QCIs associated with VoIP or VoLTE services. For example, in an implementation that uses the LTE wireless protocol, the quality of service metric may comprise one or more of QCI 1, QCI 5, or any other QCI suitable to provide voice services. Thus, the quality of service metrics for wireless devices 142 and 144 (e.g., QCIs) may indicate that the wireless devices are executing or initiating a VoIP or VoLTE voice call. In other embodiments, other wireless services, quality of service criteria, and QCIs may be implemented.

At step 804, a link delay for communication between the relay wireless device and end-user wireless devices may be determined. For example, a link delay, or propagation delay, for communication between relay wireless device 130 and wireless devices 142 and 144 may be determined. Because relay wireless device 130 services wireless devices 142 and 144 via a connection to small cell 131, the link delay may include the delay in transmitting data from small cell 131 to these wireless devices. The link delay may be determined based on a timing advanced (TA) used by small cell 131 to communicate with wireless devices 142 and 144. In other embodiments, the link delay may be determined in any other suitable manner.

At step 806, a sum of the determined link delay and a packet delay associated with semi-persistent scheduling may be compared to a packet delay criteria corresponding to the quality of service metric for the set of wireless devices. For example, a packet delay associated with semi-persistent scheduling may be added to the determined link delay to calculate a sum. The packet delay associated with the semi-persistent scheduling may comprise a predetermined periodicity for the scheduling (e.g., 20 ms, 15 ms, and the like).

In an embodiment, the packet delay criteria may comprise a criteria or threshold delay time based on the quality of service metric for the set of wireless devices (e.g., wireless devices 142 and 144). For example, the quality of service metric may indicate that the wireless devices are executing a VoIP or VoLTE voice call, and the criteria may be calculated based on an acceptable delay between a backhaul connection to the network and data arrival at the end-user wireless device. For example, for non-relayed communication, because the backhaul connection point comprises the access node, the delay between a backhaul connection to the network and data arrival at the end-user wireless device comprises the time that it takes to transmit the data from the access node to the end-user wireless device. In a relay setting, this same delay includes an additional hop from access node to relay device, such as relay wireless device 130. As such, the packet delay criteria may be calculated to ensure reliable voice services will be provided to wireless devices 142 and 144 when semi-persistent scheduling (with the predetermined periodicity) is implemented.

At step 808 wireless resources may be scheduled for the relay wireless device using semi-persistent scheduling such that wireless resources are pre-allocated for the relay wireless device based on a periodicity when the sum meets the packet delay criteria. For example, when the sum meets the packet delay criteria, the comparison may indicate that semi-persistent scheduling may be used to provide reliable voice services at the set of wireless devices. The semi-persistent scheduling between access node 110 and relay wireless device 130 may be established in a manner similar to other embodiments discussed herein.

At step 810, wireless resources may be scheduled for the relay wireless device using dynamic scheduling such when the sum fails to meet the packet delay criteria. For example, when the sum fails to meet the packet delay criteria, the comparison may indicate that semi-persistent scheduling may not be used to provide reliable voice services at the set of wireless devices. Accordingly, semi-persistent scheduling will not be used, and instead dynamic scheduling (e.g., a default scheduling) will be used between access node 110 and relay wireless device 130.

Figure 9:
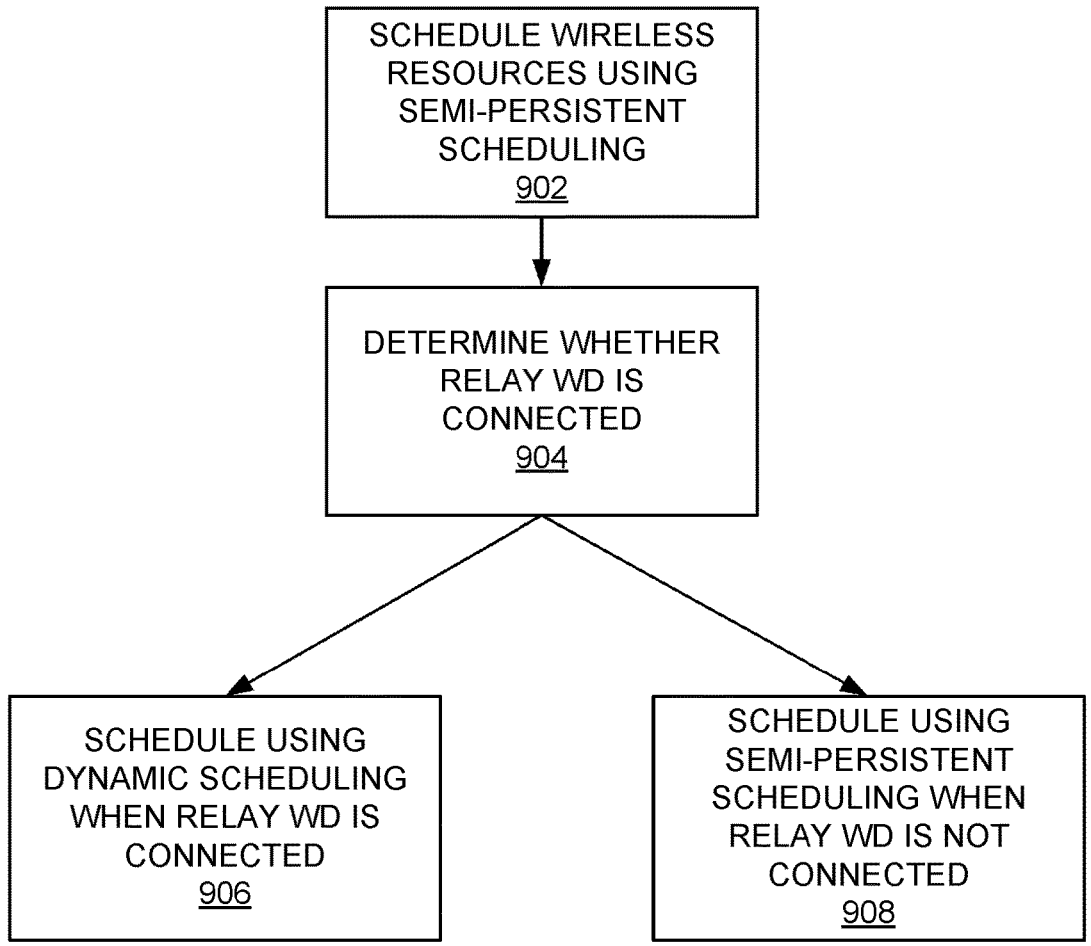
FIG. 9 depicts an exemplary method for configuring a scheduler based on the connection status of a relay wireless device according to some embodiments.

FIG. 9 illustrates an exemplary method for configuring a scheduler based on the connection status of a relay wireless device according to an embodiment. The method will be discussed with reference to the exemplary communication system 100 illustrated in FIG. 1, however, the method can be implemented with any suitable communication system.

At step 902, wireless resources may be scheduled for a plurality of end-user wireless devices using semi-persistent scheduling such that wireless resources are pre-allocated for the wireless devices based on a periodicity. For example, a scheduler at access node 110 may implement semi-persistent scheduling such that predetermined wireless resources for the semi-persistent scheduling are pre-allocated (reserved) for one or more end-user wireless devices and such pre-allocation is repeated according to a periodicity for the semi-persistent scheduling. In an embodiment, the semi-persistent scheduling may be used to carry data from access node 110 to end-user wireless devices, such as wireless device 140 and other wireless devices not depicted.

In some embodiments, the wireless devices that are scheduled using semi-persistent scheduling may comprise a quality of service metric (e.g., QCI) that meets a quality of service criteria. For example, the quality of service criteria may be a particular QCI or a set of QCIs associated with VoIP or VoLTE services, or any other voice service. In an implementation that uses LTE, the quality of service criteria may comprise one or more of QCI 1, QCI 5, or any other QCI suitable to provide voice services. Here, the semi-persistent scheduling for these wireless devices may be performed based on the advantages for wireless voice services provided by such scheduling.

At step 904, it may be determined whether a relay wireless device is in communication with the access node. For example, it may be determined whether a relay wireless device is in communication with (e.g., comprises an RRC connection with) access node 110. For example, it may be determined whether one or more of relay wireless device 130 and relay wireless device 132 is in communication with access node 110. Access node 110 may identify a connected wireless device as a relay wireless device in any suitable manner. For example, a relay wireless device may be identified based on a predetermined QCI used to communicate with the relay wireless device, based on a Public Land Mobile Network (PLMN) number associated with a relay wireless device, or based on a Mobile Subscriber Identification Number (MSIN) associated with a relay wireless device. In another example, a buffer status report transmitted by the relay wireless device may indicate to the access node that the wireless device comprises a relay, as further described herein. In another example, characteristics for the wireless device, such as uplink signal strength, mobility, consistent channel conditions, and any other suitable characteristics, may indicate that the wireless device comprises a relay.

At step 906, it may be determined that the access node is in communication with a relay wireless device, and dynamic scheduling may be used to communicate with wireless devices in communication with the access node. For example, based on the determination that a relay wireless device is in communication with access node 110, semi-persistent scheduling may be disabled. Accordingly, any semi-persistent scheduling that is being performed at the time of the determination may be switched to dynamic scheduling either by interrupting the semi-persistent scheduling or by terminating the scheduling at the end of the renewal period. The semi-persistent scheduling may be disabled until it is determined that a relay wireless device is no longer in communication with access node 110.

In an embodiment, the wireless devices that had previously been scheduled using semi-persistent scheduling, such as wireless devices that comprise a quality of service metric that meets a criteria, may no longer be scheduled using semi-persistent scheduling because such scheduling has been disabled. Accordingly, the wireless devices that comprise a quality of service metric that meets a criteria may also be scheduled using dynamic scheduling.

At step 908, it may be determined that the access node is not in communication with a relay wireless device, and semi-persistent scheduling may be used to communicate with wireless devices in communication with the access node. For example, based on the determination that a relay wireless device is not in communication with access node 110, semi-persistent scheduling may be enabled or may continue to be enabled. Accordingly, any semi-persistent scheduling that is being performed at the time of the determination may continue or be renewed. Further, any new semi-persistent scheduling, such as for a new wireless device that comprises a quality of service metric that meets a criteria, may be established.

In an embodiment, determining that a relay wireless device is in communication with an access node may indicate that use of semi-persistent scheduling could cause a service issue. For example, use of semi-persistent scheduling for a relay wireless device that communicates backhaul data for an end-user wireless device performing a voice call may result in latency issues for voice data related to the voice call. Accordingly, in some embodiments, semi-persistent scheduling may be disabled to ensure that the relay wireless device does not encounter such a service issue.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateways 102, and/or network 101.

Figure 10:
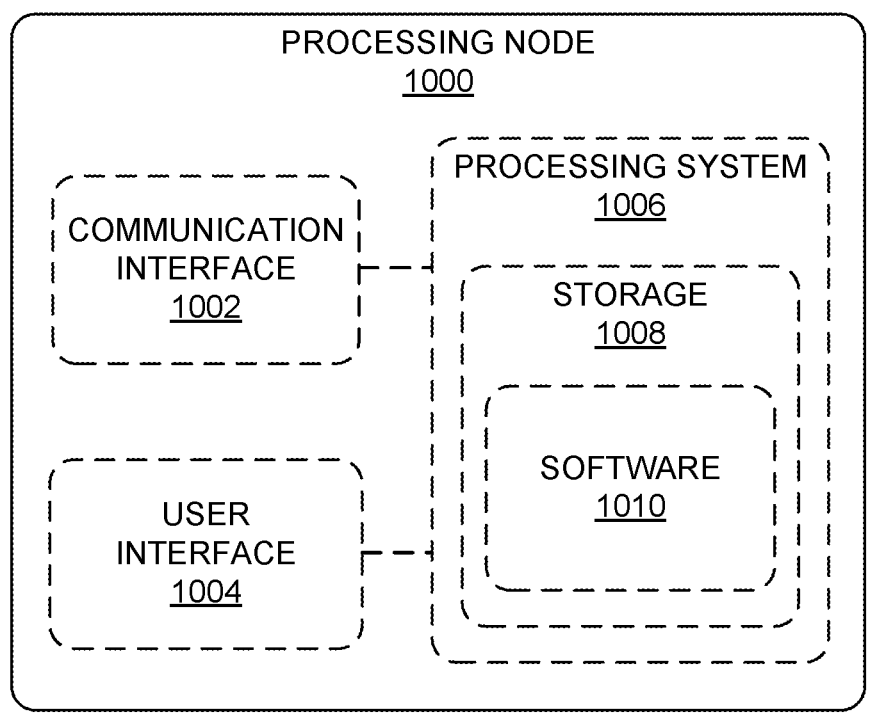
FIG. 10 depicts an exemplary processing node according to some embodiments.

FIG. 10 depicts an exemplary processing node 1000 comprising communication interface 1002, user interface 1004, and processing system 1006 in communication with communication interface 1002 and user interface 1004. Processing system 8 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. Software 1010 may include computer programs, firmware, or some other form of machine-readable instructions, including an operating system, utilities, drivers, network interfaces, applications, or some other type of software. For example, software 1010 may include modules for performing the operations described with reference to FIGS. 4 and 6-8. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for configuring a semi-persistent scheduler, the method comprising:
    communicating backhaul data between an access node and a relay wireless device, wherein the relay wireless device serves as backhaul for a plurality of end-user wireless devices and a set of the plurality of the end-user wireless devices comprise a quality of service metric that meets a quality of service criteria;
    scheduling wireless resources for the relay wireless device using semi-persistent scheduling such that wireless resources are pre-allocated for the relay wireless device based on a periodicity;
    transmitting, according to the semi-persistent scheduling, data from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling;
    establishing the semi-persistent scheduling for the relay wireless device at a first time, wherein the pre-allocated resources associated with the semi-persistent scheduling are used to carry data for the set of wireless devices that comprise a quality of service metric that meets the quality of service criteria at the first time;
    determining that one of the plurality of wireless device in communication with the relay wireless device that is not part of the set of wireless devices comprises a quality of service metric that meets the quality of service criteria, wherein the determining occurs after the first time; and
    scheduling transmissions that carry data for the identified wireless device from the access node to the relay wireless device using dynamic scheduling;
    wherein the established semi-persistent scheduling comprises a renewal period such that the semi-persistent scheduling is renewed or terminated upon expiration of the renewal period.

2. The method of claim 1, further comprising:
    upon expiration of the renewal period, renewing the semi-persistent scheduling such that pre-allocated resources associated with the renewed semi-persistent scheduling are used to carry data for the set of wireless devices that comprise a quality of service metric that meets the quality of service criteria and the identified wireless device that comprises quality of service metric that meets the quality of service criteria.

3. The method of claim 1, wherein a traffic priority for semi-persistent scheduling is determined based on a default traffic priority, a number of wireless devices that comprise the set of wireless devices, and a load at the access node.

4. The method of claim 3, wherein the determined traffic priority for the semi-persistent scheduling is directly related to the number of wireless devices that comprise the set of wireless devices and the load at the access node.

5. The method of claim 1, wherein the periodicity for the semi-persistent scheduling is based on the number of wireless devices that comprise the set of wireless devices.

6. The method of claim 1, wherein the quality of service metrics for the set of wireless devices comprise quality of service class identifiers, and the quality of service metrics meet the quality of service criteria when the quality of service class identifiers for the set of wireless devices are associated with voice data.

7. A system for configuring a semi-persistent scheduler, the system comprising:
    an access node with a processor configured to:
    communicate backhaul data between the access node and a relay wireless device, wherein the relay wireless device serves as backhaul for a plurality of end-user wireless devices and a set of the plurality of the end-user wireless devices comprise a quality of service metric that meets a quality of service criteria;
    schedule wireless resources for the relay wireless device using semi-persistent scheduling such that wireless resources are pre-allocated for the relay wireless device based on a periodicity;
    transmit, according to the semi-persistent scheduling, data from the access node to the relay wireless device based on the periodicity, wherein data for the set of end-user wireless devices that is received at the access node between transmissions for the semi-persistent scheduling is queued such that it is transmitted to the relay wireless device at a next transmission for the semi-persistent scheduling;
    wherein the access node is further configured to establish the semi-persistent scheduling for the relay wireless device at a first time, wherein the pre-allocated resources associated with the semi-persistent scheduling are used to carry data for the set of wireless devices that comprise a quality of service metric that meets the quality of service criteria at the first time;
    wherein the access node is further configured to: determine that one of the plurality of wireless device in communication with the relay wireless device that is not part of the set of wireless devices comprises a quality of service metric that meets the quality of service criteria, wherein the determining occurs after the first time; and schedule transmissions that carry data for the identified wireless device from the access node to the relay wireless device using dynamic scheduling;

wherein the established semi-persistent scheduling comprises a renewal period such that the semi-persistent scheduling is renewed or terminated upon expiration of the renewal period.

8. The system of claim 7, wherein the access node is further configured to:

upon expiration of the renewal period, renew the semi-persistent scheduling such that pre-allocated resources associated with the renewed semi-persistent scheduling are used to carry data for the set of wireless devices that comprise a quality of service metric that meets the quality of service criteria and the identified wireless device that comprises quality of service metric that meets the quality of service criteria.

9. The system of claim 7, wherein a traffic priority for semi-persistent scheduling is determined based on a default traffic priority, a number of wireless devices that comprise the set of wireless devices, and a load at the access node.

10. The system of claim 9, wherein the determined traffic priority for the semi-persistent scheduling is directly related to the number of wireless devices that comprise the set of wireless devices and the load at the access node.

11. The system of claim 7, wherein the periodicity for the semi-persistent scheduling is based on the number of wireless devices that comprise the set of wireless devices.

12. The system of claim 7, wherein the quality of service metrics for the set of wireless devices comprise quality of service class identifiers, and the quality of service metrics meet the quality of service criteria when the quality of service class identifiers for the set of wireless devices are associated with voice data.

* * * * *